(12) United States Patent
Lee et al.

(10) Patent No.: US 10,611,109 B2
(45) Date of Patent: Apr. 7, 2020

(54) MANUFACTURING METHOD OF OPTICAL FILM AND OPTICAL FILM

(71) Applicant: LG CHEM, LTD., Seoul (KR)

(72) Inventors: Jeong Hwan Lee, Daejeon (KR); Yun Seok Choe, Daejeon (KR); Joo Sang Kim, Daejeon (KR); Do Won Yang, Daejeon (KR); Yong Gou Lee, Daejeon (KR); Bong Su Jeung, Daejeon (KR); Jea Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 304 days.

(21) Appl. No.: 15/628,954

(22) Filed: Jun. 21, 2017

(65) Prior Publication Data

US 2017/0368772 A1 Dec. 28, 2017

(30) Foreign Application Priority Data

Jun. 22, 2016 (KR) .......................... 10-2016-0077993

(51) Int. Cl.
| | |
|---|---|
| *B29D 11/00* | (2006.01) |
| *B32B 33/00* | (2006.01) |
| *B32B 37/00* | (2006.01) |
| *G02B 1/14* | (2015.01) |
| *G02B 5/30* | (2006.01) |
| *G02B 1/08* | (2006.01) |
| *B32B 38/04* | (2006.01) |
| *B29L 9/00* | (2006.01) |

(52) U.S. Cl.
CPC .... *B29D 11/00644* (2013.01); *B29D 11/0073* (2013.01); *B32B 33/00* (2013.01); *B32B 37/0053* (2013.01); *G02B 1/08* (2013.01); *G02B 1/14* (2015.01); *G02B 5/30* (2013.01); *G02B 5/3033* (2013.01); *B29L 2009/005* (2013.01); *B32B 2038/045* (2013.01); *B32B 2250/02* (2013.01); *B32B 2307/42* (2013.01); *B32B 2551/00* (2013.01)

(58) Field of Classification Search
CPC .......... B29D 11/00644; B29D 11/0073; B32B 33/00; B32B 37/0053; G02B 1/08; G02B 5/30

See application file for complete search history.

(56) References Cited

U.S. PATENT DOCUMENTS

2014/0116618 A1 5/2014 Nakata et al.

FOREIGN PATENT DOCUMENTS

| CN | 102632680 A | 8/2012 |
|---|---|---|
| CN | 102756535 A | 10/2012 |
| JP | 2000-284269 A | 10/2000 |

(Continued)

*Primary Examiner* — Mathieu D Vargot
(74) *Attorney, Agent, or Firm* — Dentons US LLP

(57) ABSTRACT

Provided is a manufacturing method of an optical film, which manufactures an optical film in which at least a first film and a second film are stacked, the method including: pressing the first film and the second film with the optical film by passing both the first film and the second film between a pair of pressing rolls; forming a slit line in a width direction of the optical film by cutting the second film without cutting the first film at a rear end of a connection portion when the connection portion is included, to which a unit film is connected by a connection member between the first film and the second film which are pressed in the pressing; and conveying the optical film by passing the optical film with the slit line in the slit forming between a pair of conveying rolls.

7 Claims, 9 Drawing Sheets

(56) References Cited

FOREIGN PATENT DOCUMENTS

| | | |
|---|---|---|
| KR | 101019621 B1 | 3/2011 |
| KR | 1020110086329 A | 7/2011 |
| KR | 10-2011-0122404 A | 11/2011 |
| KR | 10-2014-0053773 A | 5/2014 |
| KR | 10-2015-0073201 A | 6/2015 |

[Figure 1]
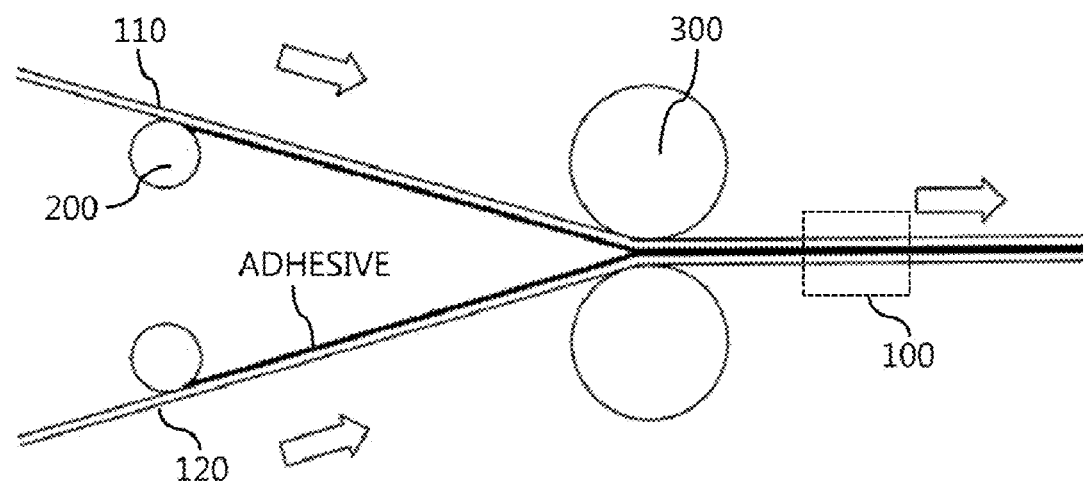

[Figure 2A]
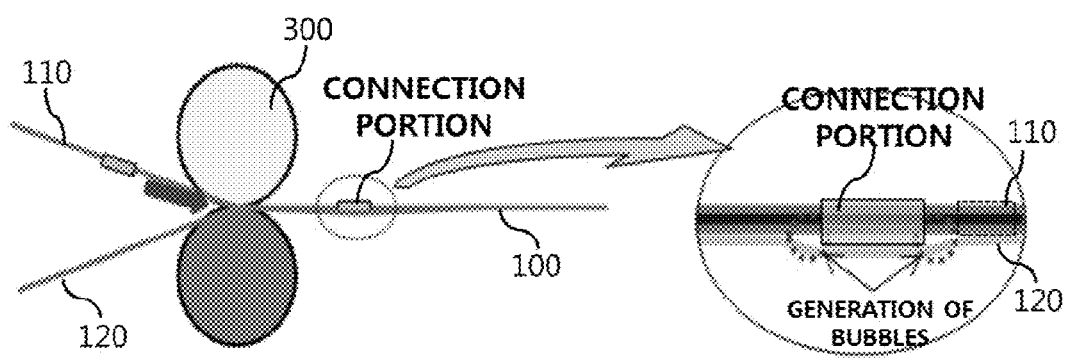

[Figure 2B]
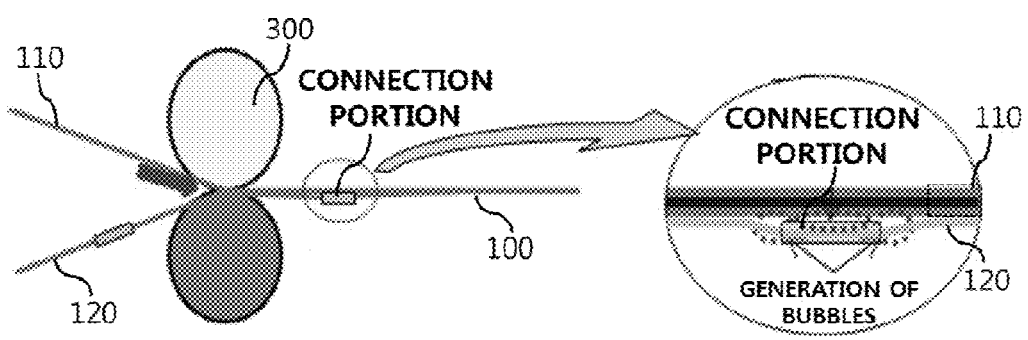

[Figure 3A]
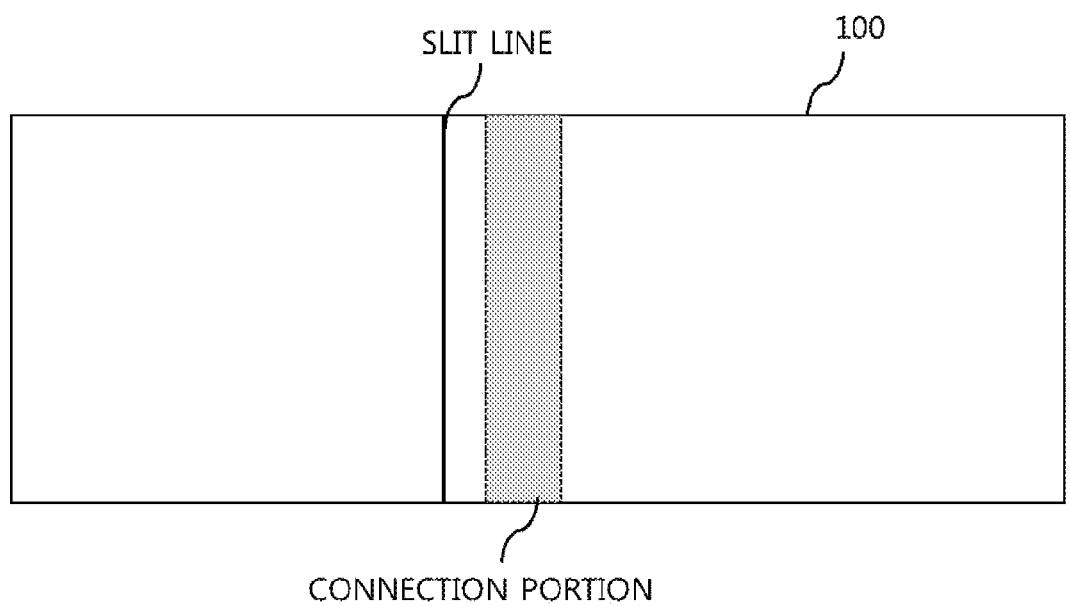

[Figure 3B]
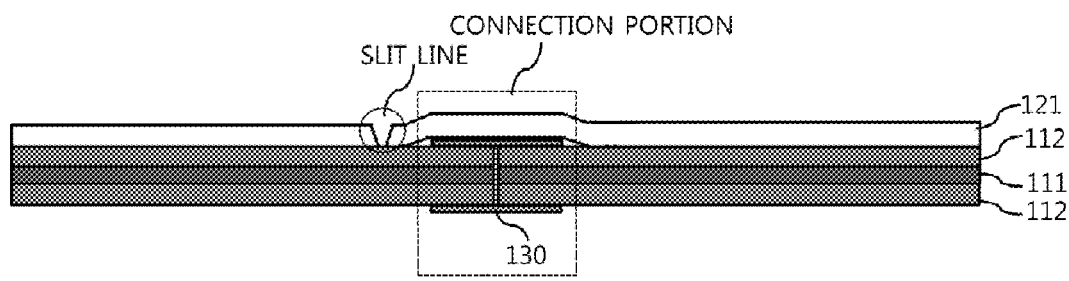

[Figure 4]
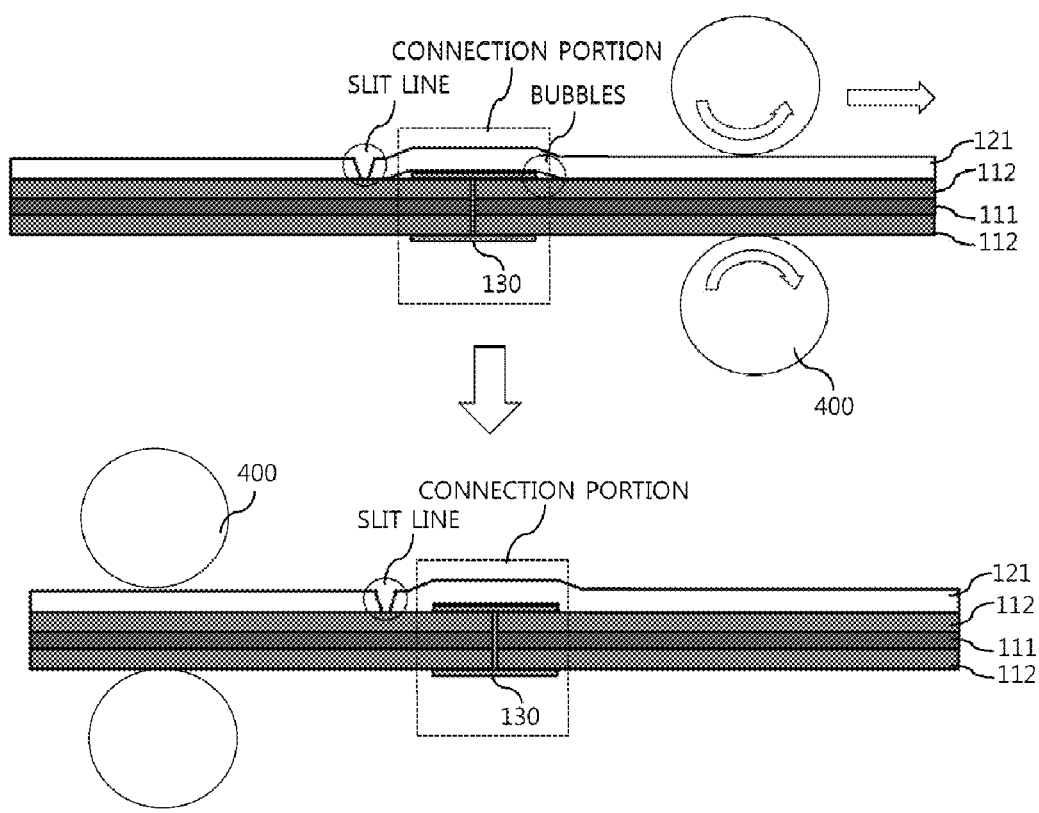

[Figure 5A]
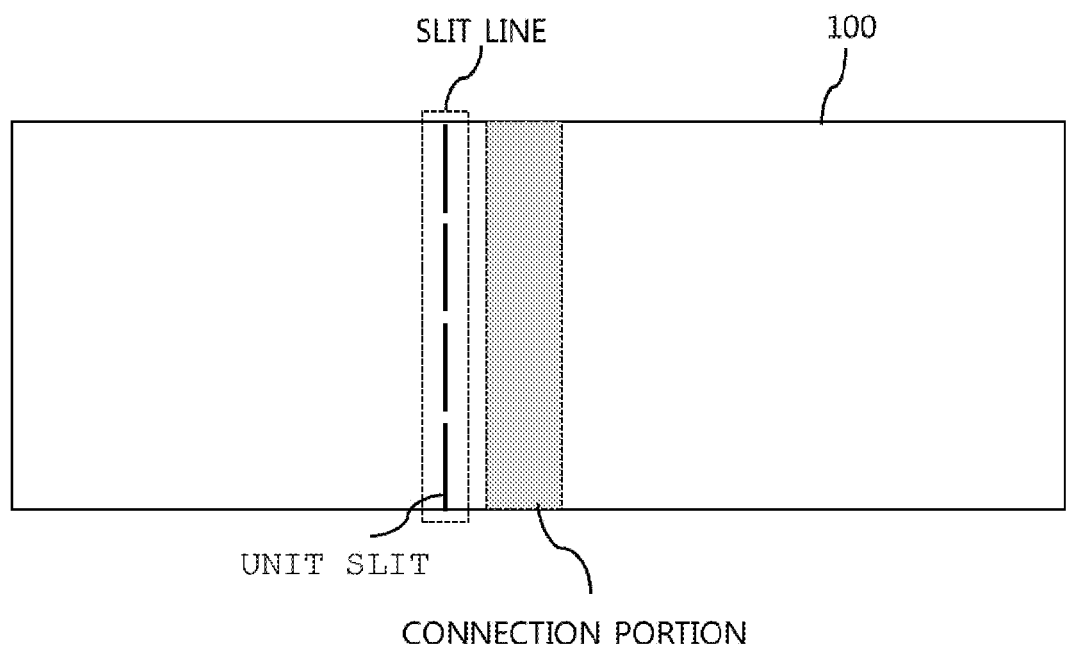

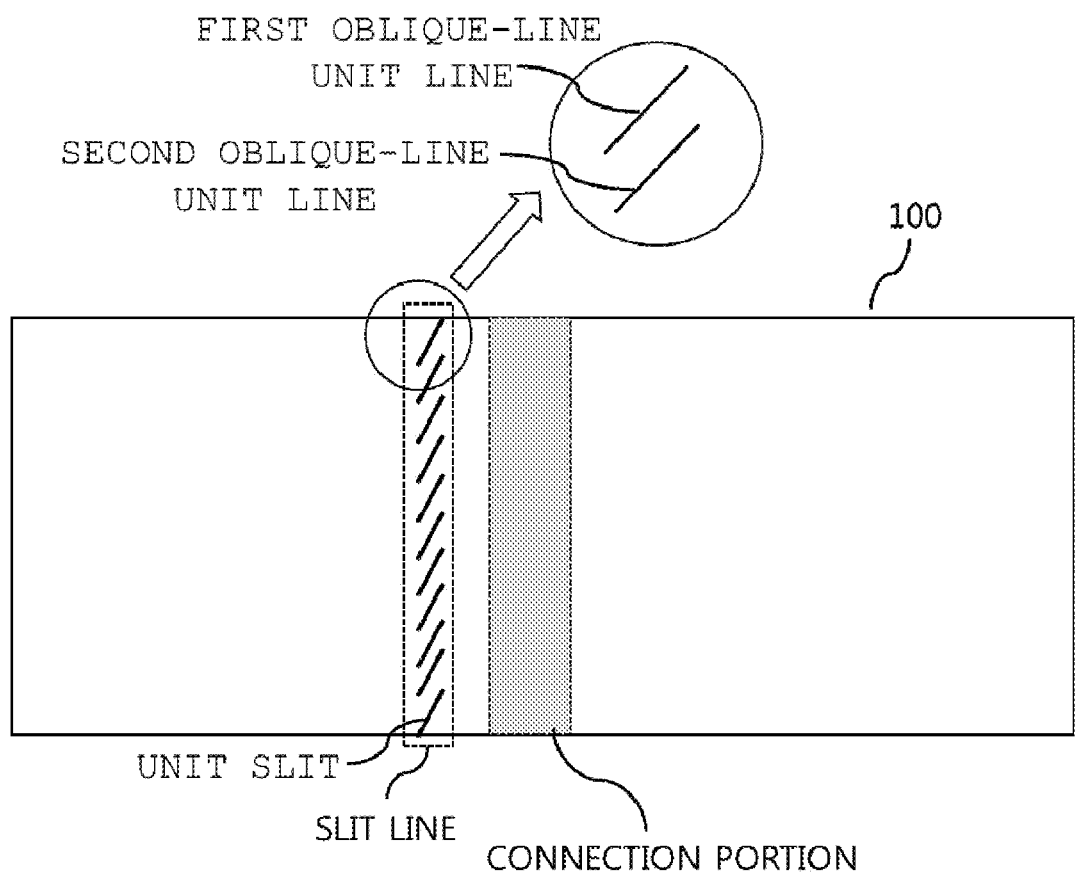

[Figure 6]
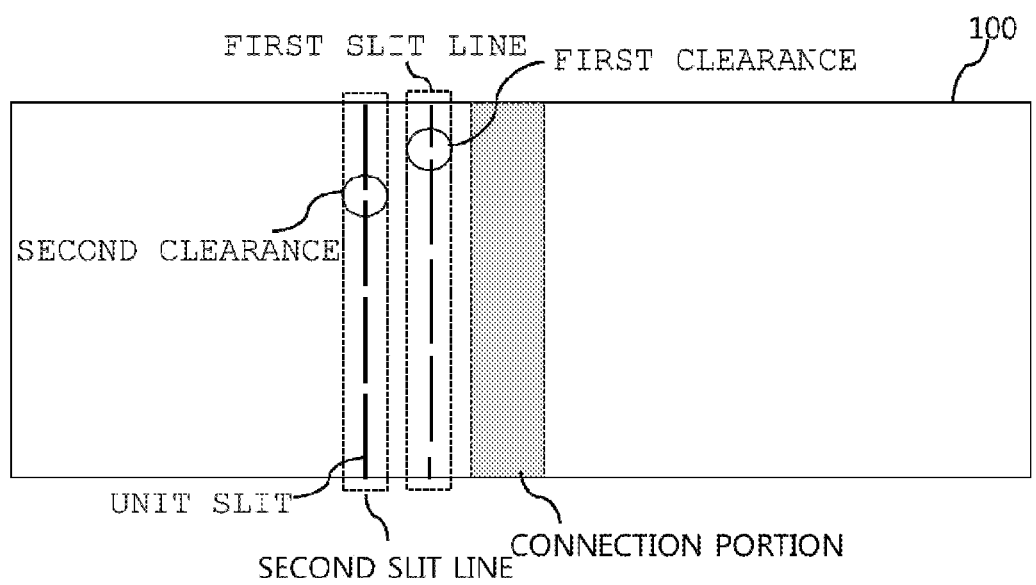

MANUFACTURING METHOD OF OPTICAL FILM AND OPTICAL FILM

This application claims the benefit of Korean Patent Application No. 10-2016-0077993, filed Jun. 22, 2016, the contents of which are incorporated herein by reference in their entirety for all purposes as if fully set forth below.

TECHNICAL FIELD

The present invention relates to a manufacturing method of an optical film and an optical film, and more particularly, to a manufacturing method of an optical film, which removes bubbles generated in the optical film during a process of manufacturing the optical film and an optical film manufactured thereby.

BACKGROUND ART

In order to manufacture display units including a liquid crystal display (LCD), organic light emitting diodes (OLED), a plasma display panel (PDP), an electrophoretic display (EPD), and the like, an optical film having an optical characteristic is used.

In general, the optical film has a structure in which a polarization film having the optical characteristic and a protective film protecting the polarization film are stacked. In order to manufacture the optical film, the polarization film and the protective film may be pressed while both the polarization film and the protective film having a large length may pass between a pair of rolls.

The optical film may be manufactured by a continuous process. In order to continuously manufacture the optical film, the polarization film extended by connecting the end of the polarization film and the end of another polarization film may be used for manufacturing the optical film and the protective film extended by connecting the end of the protective film and the end of another protective film may be used for manufacturing the optical film. The ends of the polarization film may be connected or the ends of the protective film may be connected by using a known bonding means such as an adhesive tape, etc.

However, when the optical film is manufactured by using the polarization film or the protective film connected by using the adhesive tape, the polarization film and the protective film cannot be completely pressed by a part connected by the adhesive tape, and as a result, the bubbles are generated in the manufactured optical film. The bubbles generated in the optical film reduce the optical characteristic of the optical film and the optical film having the bubbles causes an error of the display unit manufactured by using the optical film.

DETAILED DESCRIPTION OF THE INVENTION

Technical Problem

The present invention has been made in an effort to provide a manufacturing method of an optical film, which removes bubbles generated in the optical film during a process of manufacturing the optical film by using a polarization film or a protective film connected by a connection member and an optical film manufactured thereby.

Technical Solution

An exemplary embodiment of the present invention provides a manufacturing method of an optical film, which manufactures an optical film in which at least a first film and a second film are stacked, including: pressing the first film and the second film with the optical film by passing both the first film and the second film between a pair of pressing rolls; forming a slit line in a width direction of the optical film by cutting the second film without cutting the first film at a rear end of a connection portion when the connection portion is included, to which a unit film is connected by a connection member between the first film and the second film which are pressed in the pressing; and conveying the optical film by passing the optical film with the slit line in the slit forming between a pair of conveying rolls.

The first film may be a polarization film and the second film may be a surface protective film.

In the slit line forming, the slit lines may be formed at both a front end and a rear end of the connection portion.

The slit line formed in the slit line forming may be constituted by a plurality of unit slits which are spaced apart from each other in the width direction of the optical film.

The unit slit may be formed to be inclined to the width direction of the optical film.

In the case of the slit lines formed in the slit line forming, a pair of slit lines at least including a first slit line and a second slit line may be spaced apart from each other in the longitudinal direction of the optical film.

Each of the first slit line and the second slit line may be constituted by a plurality of unit slits which are spaced apart from each other in the width direction of the optical film.

A first clearance between adjacent unit slits on the first slit line and a second clearance between the adjacent unit slits on the second slit line may be arranged to cross each other in the width direction of the optical film.

Another exemplary embodiment of the present invention provides an optical film manufactured by a manufacturing method of an optical film of an exemplary embodiment of the present invention.

Advantageous Effects

According to an exemplary embodiment of the present invention, when an optical film is manufactured by using a first film or a second film including a connection portion in which unit films are connected by a connection member, bubbles in the optical film, which are generated as the first film and the second film cannot be completely pressed can be simply and easily removed due to the connection portion.

According to another exemplary embodiment of the present invention, an error of a display unit manufactured by using an optical film can be reduced.

BRIEF DESCRIPTION OF DRAWINGS

FIG. 1 is a diagram illustrating manufacturing of an optical film by using a first film and a second film according to an exemplary embodiment of the present invention.

FIGS. 2A and 2B are diagrams illustrating manufacturing of the optical film by using the first film or the second film including a connection portion according to the exemplary embodiment of the present invention.

FIG. 3A is a diagram illustrating that a slit line is formed on the optical film by cutting the second film according to the exemplary embodiment of the present invention and FIG. 3B is a diagram illustrating a cross section of the optical film with the slit line according to the exemplary embodiment of the present invention.

FIG. 4 is a diagram illustrating that the optical film with the slit line according to the exemplary embodiment of the present invention passes between a pair of conveying rolls.

FIGS. 5A and 5B are diagrams illustrating an optical film with a slit line consisting of a plurality of unit slits according to the exemplary embodiment of the present invention.

FIG. 6 is a diagram illustrating an optical film with a first slit line and a second slit line according to another exemplary embodiment of the present invention.

BEST MODE

Hereinafter, exemplary embodiments of the present invention will be described in detail so as to be easily implemented by those skilled in the art, with reference to the accompanying drawings. However, the present invention can be realized in various different forms, and is not limited to the exemplary embodiments described herein. In addition, a part not related with a description is omitted in order to clearly describe the present invention in the drawings and throughout the specification, like reference numerals designate like elements.

Terms used in the present specification will be described in brief and the present invention will be described in detail.

Terms used in the present invention adopt general terms which are currently widely used as possible by considering functions in the present invention, but the terms may be changed depending on an intention of those skilled in the art, a precedent, and emergence of new technology. Further, in a specific case, a term which an applicant arbitrarily selects is present and in this case, a meaning of the term will be disclosed in detail in a corresponding description part of the invention. Accordingly, a term used in the present invention should be defined based on not just a name of the term but a meaning of the term and contents throughout the present invention.

Throughout the specification, unless explicitly described to the contrary, the word "comprise" and variations such as "comprises" or "comprising", will be understood to imply the inclusion of stated elements but not the exclusion of any other elements.

Hereinafter, the present invention will be described in detail with reference to the accompanying drawings.

According to an exemplary embodiment of present invention, provided is a manufacturing method of an optical film, which manufactures an optical film 100 in which at least a first film 110 and a second film 120 are stacked, the method including: pressing the first film 110 and the second film 120 with the optical film 100 by passing both the first film 110 and the second film 120 between a pair of pressing rolls 300; forming a slit line in a width direction of the optical film by cutting the second film 120 without cutting the first film 110 at a rear end of a connection portion when the connection portion is included, to which a unit film is connected by a connection member 130 between the first film 110 and the second film 120 which are pressed in the pressing; and conveying the optical film 100 by passing the optical film 100 with the slit line in the slit forming between a pair of conveying rolls 400.

According to an exemplary embodiment of the present invention, when an optical film 100 is manufactured by using a first film 110 or a second film 120 including a connection portion in which unit films are connected by a connection member 130, bubbles in the optical film 100, which are generated as the first film 110 and the second film 120 cannot be completely pressed can be simply and easily removed due to the connection portion.

FIG. 1 is a diagram illustrating manufacturing of an optical film by using a first film and a second film according to an exemplary embodiment of the present invention.

Referring to FIG. 1, in a pressing step, a first film 110 and a second film 120 are simultaneously passed between a pair of pressing rolls 300 and pressed to manufacture an optical film 100. The first film 110 and the second film 120 may be supplied to the pressing rolls 300 by a supply roll 200. The first film 110 and the second film 120 supplied to the pressing roll 300 contact each other between the pair of pressing rolls 300 and are pressed to manufacture the optical film 100 in which the first film 110 and the second film 120 are stacked.

In order to maintain a shape of the optical film 100 formed by pressing the first film 110 and the second film 120, the first film 110 and the second film 120 may be adhered by an adhesive. For example, the adhesive may be applied onto one surface of the first film 110 contacting the second film 120 or one surface of the second film 120 contacting the first film 110. Further, the adhesive may be applied onto both one surface of the first film 110 contacting the second film 120 and one surface of the second film 120 contacting the first film 110. That is, even after the first film 110 and the second film 120 are pressed by the pair of pressing rolls, the first film 110 and the second film 120 may be maintained in a stacked form by the adhesive formed between the first film 110 and the second film 120.

According to an exemplary embodiment of the present invention, the first film may be a polarization film and the second film may be a surface protective film 121.

The polarization film may include a polarizer 111 and a polarizer protective film 112 formed on one surface or two surfaces of the polarizer 111. The polarization film may include, for example, a polarizer 111 having a thickness of 5 to 80 μm and a polarizer protective film 112 which is attached to one surface or two surfaces of the polarizer 111 and has a thickness of about 1 to 500 μm.

The polarizer 111 may be prepared by dyeing, crosslinking, and stretching a polyvinyl alcohol-based film. The dyeing, crosslinking, and stretching processes may be simultaneously performed and sequentially performed. A swelled polyvinyl alcohol-based film may be used as the polyvinyl alcohol-based film. The polyvinyl alcohol-based film is immersed in a solution containing iodine or a dichroic dye to be dyed by adsorbing the iodine or the dichroic dye in the polyvinyl alcohol film. The dyed polyvinyl alcohol-based film is cleaned, uniaxially stretched with a stretching magnification of 3 to 7 times in a solution containing boric acid, boron, or the like, and then dried.

The polarizer protective film 112 which may be formed on one surface or two surfaces of the polarizer 111 may use a suitable transparent film. As the polarizer protective film 112, a thermoplastic resin having excellent transparency, mechanical strength, thermal stability, moisture barrier property, isotropy, and the like may be used. As the thermoplastic resin, for example, a cellulose resin such as triacetylcellulose, a polyester resin, a polyether sulfone resin, a polysulfone resin, a polycarbonate resin, a polyamide resin, a polyimide resin, a polyolefin resin, a methacrylic resin, a cyclic polyolefin resin (a norbornene resin), a polyarylate resin, a polystyrene resin, a polyvinyl alcohol resin, and mixtures thereof may be used. In the polarizer protective film 112, one or more kinds of additives may be included. As the additives, for example, ultraviolet absorbers, antioxidants, plasticizers, release agents, color prevention agents, flame retardants, antistatic agents, pigments, colorants and the like may be used.

The surface protective film 121 is used for preventing the surface of the polarization film from being contaminated or damaged in a circulation process of the polarization film or a process of adhering a liquid crystal display, and is adhered to the polarization film by the adhesive to be easily released when being attached to the liquid crystal display. Further, as the surface protective film 121, for example, a polyethylene film, a polypropylene film, a polyethylene terephthalate film, and the like may be used. However, the material of the surface protective film 121 is not limited to the aforementioned examples.

According to an exemplary embodiment of the present invention, the first film may be a polarization film and the second film may be a surface protective film 121, but a type of first film and a type of second film are not limited. That is, a method of manufacturing the optical film in which the first film and the second film are stacked according to the exemplary embodiment of the present invention may be applied to even a case of manufacturing a multilayered film in which a plurality of films is stacked.

However, hereinafter, for convenience of description, a case of using the polarization film as the first film and the surface protective film as the second film will be mainly described in detail.

FIGS. 2A and 2B are diagrams illustrating manufacturing of the optical film by using the first film or the second film including a connection portion according to the exemplary embodiment of the present invention.

The optical film 100 may be manufactured by using the first film 110 to which a unit film of the first film 110 is connected by a connection member 130, and the optical film 100 may be manufactured by using the second film 120 to which a unit film of the second film 120 is connected by the connection member 130.

The optical film 100 may be continuously manufactured by using the first film 110 or the second film 120 including the connection portion to which the unit film is connected by the connection member 130. For example, when the length of the first film 110 is smaller than that of the second film 120, in the process of manufacturing the optical film 100, an end of the first film 110 first reaches the pair of pressing rolls 300 and thereafter, the optical film 100 may no longer be manufactured. However, the process of manufacturing the optical film may be continuously performed by connecting the end of the first film 110 with a new unit film of the first film 110 by the connection member 130. Similarly, when the length of the second film 120 is smaller than that of the first film 110, the process of manufacturing the optical film may be continuously performed by connecting the end of the second film 120 with a new unit film of the second film 120 by the connection member 130.

A known means may be used as the connection member 130, and if the means is capable of connecting the unit films of the first film 110 or the unit films of the second film 120, there is no limit in the means. For example, as the connection member 130, an adhesive tape may be used. Further, a thickness of the connection member 130 connecting the unit films may be 10 μm to 5 mm and a width of the connection member may be within 5 mm.

FIG. 2A is a diagram illustrating manufacturing the optical film by using the first film including the connection portion and FIG. 2B is a diagram illustrating manufacturing the optical film by using the second film including the connection portion.

Referring to FIG. 2A, in the case of manufacturing the optical film by pressing the first film 110 including the connection portion and the second film 120 without the connection portion, the first film 110 and the second film 120 are not completely pressed by the connection portion. Further, referring to FIG. 2B, in the case of manufacturing the optical film by pressing the second film 120 including the connection portion and the first film 110 without the connection portion, the first film 110 and the second film 120 are not completely pressed by the connection portion. As illustrated in FIGS. 2A and 2B, the first film 110 and the second film 120 are not completely pressed and thus, a space is generated in the vicinity of the connection portion, that is, at a front end, a rear end, or a lower end of the connection portion, and air flows into the space in the process of pressing the first film 110 and the second film 120 to generate bubbles in the optical film 100.

In a process of conveying the optical film or a process of rolling the optical film in a roll form, the bubbles generated in the vicinity of the connection portion move from the vicinity of the connection portion to be distributed in a wide range in the optical film.

The optical film 100 with the bubbles therein deteriorates in optical property and may cause a defect of a display unit manufactured by using the optical film 100. Accordingly, when the bubbles generated in the vicinity of the connection portion are not removed, defects may be widely generated in the optical film.

FIG. 3A is a diagram illustrating that a slit line is formed on the optical film by cutting the second film according to the exemplary embodiment of the present invention and FIG. 3B is a diagram illustrating a cross section of the optical film with the slit line according to the exemplary embodiment of the present invention.

FIG. 4 is a diagram illustrating that the optical film with the slit line according to the exemplary embodiment of the present invention passes between a pair of conveying rolls.

In the step of forming the slit line, at the rear end of the connection portion, a slit line is formed in a width direction of the optical film 100 by cutting the second film 120 without cutting the first film 110.

As illustrated in FIG. 3A, the slit line may be formed at the rear end of the connection portion of the optical film 100 with the generated bubbles. In the case of manufacturing the optical film by using the first film 110 or the second film 120 including the connection portion, bubbles may be generated in the vicinity of the connection portion. However, according to the exemplary embodiment of the present invention, at the rear end of the connection portion with the generated bubbles, the slit line is formed to discharge the air in the optical film 100, that is, the bubbles. Referring to FIG. 4, in the conveying step, the optical film 100 with the formed slit line in the step of forming the slit passes between a pair of conveying rolls 400. While the optical film 100 including the bubbles passes through the pair of conveying rolls 400, the optical film 100 is pressed and simultaneously conveyed forwards and thus, the bubbles in the vicinity of the connection portion are pushed to the rear end of the connection portion. The bubbles moving to the rear end of the connection portion are discharged to the outside through the slit line formed at the rear portion of the connection portion and the bubbles in the optical film 100 may be removed.

As illustrated in FIG. 3B, a slit line may be formed on the optical film 100 in a width direction of the optical film 100 by cutting the second film 120 without cutting the first film 110. In order to more efficiently discharge the bubbles in the optical film 100 to the outside, the slit line may be formed on the optical film 100 by cutting the second film 120 without cutting the first film 110. In the case of forming the slit line by cutting the second film 120 and cutting the first film 110 at a predetermined depth, some of the bubbles (air) pushed to the rear end of the connection portion is not discharged to the outside from the slit line and may move into the second film 120. For example, in the case of forming the slit line on the optical film 100 by cutting the second film and an interface between the polarizer protective film 112 and the polarizer 111 of the first film 110, the air pushed to the rear end of the connection portion moves to a small space between the polarizer protective film 112 and the polarizer 111 to generate new bubbles.

Accordingly, according to the exemplary embodiment of the present invention, the slit line is formed on the optical film 100 by cutting the second film 120 without cutting the first film 110 to efficiently remove the bubbles in the optical film 100.

In the step of forming the slit line according to the exemplary embodiment of the present invention, slit lines may be formed at both the front end and the rear end of the connection portion. The slit line may be formed on the optical film 100 by cutting the second film 120 without cutting the first film 110 at the front end of the connection portion. The slit line is formed at the front end of the connection portion to discharge the bubbles generated from the front end of the connection portion and more easily move the bubbles in the vicinity of the connection portion to the rear end of the connection portion. While the optical film 100 with the slit lines formed at the front end and the rear end of the connection portion passes through a pair of conveying rolls 400, some of the bubbles generated at the front end of the connection portion may be discharged to the outside through the slit line formed at the front end of the connection portion and the rest of the bubbles may be pushed to the rear end of the connection portion.

In order to form the slit line on the optical film, for example, a laser device, a cutter device, or the like may be used.

FIGS. 5A and 5B are diagrams illustrating an optical film with a slit line consisting of a plurality of unit slits according to the exemplary embodiment of the present invention.

The slit line formed in the step of forming the slit line according to the exemplary embodiment of the present invention may be formed by a plurality of unit slits which are spaced apart from each other in a width direction of the optical film 100.

Referring to FIG. 5A, a slit line constituted by a plurality of unit slits may be formed in a width direction of the optical film 100. The plurality of unit slits may be formed to be spaced apart from each other in the width direction of the optical film 100.

In the process of manufacturing the optical film 100 or the process of manufacturing the display unit by using the optical film 100, the second film 120 as the surface protective film 121 may be released from the first film 110. Referring to FIG. 3A, when the slit line is formed in the entire width direction of the optical film 100, in order to release the second film 120 from the first film 110, the second film 120 separated by the slit line needs to be released.

However, as illustrated in FIG. 5A, when the slit line including the plurality of unit slits which are spaced apart from each other in the width direction of the optical film 100 is formed on the optical film 100, bubbles in the optical film 100 may be discharged through the unit slits and the second film 120 may be released from the first film 110 once.

The length of the unit slit and a distance separated between the unit slits may be set by considering a width length of the manufactured optical film 100 and the like.

FIG. 5B is a diagram illustrating an optical film in which the unit slits according to the exemplary embodiment of the present invention are slantly formed in the width direction of the optical film.

The unit slit according to the exemplary embodiment of the present invention may be slantly formed in the width direction of the optical film 100. Referring to FIG. 5B, the unit slits are slantly formed in the width direction of the optical film 100 to increase a region where the bubbles in the optical film 100 may be discharged. That is, the unit slits are slantly formed in the width direction of the optical film to increase the entire slit length (that is, a total of lengths of the plurality of unit slits) of the slit line including the plurality of unit slits inclined in the width direction of the optical film 100. Accordingly, as the entire slit length of the corresponding slit line is increased, the region where the bubbles in the optical film 100 may be discharged is increased and the bubbles in the optical film 100 may be more efficiently removed.

One end of the unit slit (hereinafter, referred to as an oblique-line based slit) slantly formed in the width direction of the optical film 100 and the other end of another oblique-line unit slit positioned to be adjacent to the oblique-line unit slit may be formed to face each other.

As illustrated in FIG. 5B, the plurality of oblique-line unit slits may be formed so that the lower end of a oblique-line unit slit (a first oblique-line unit slit) and the upper end of another oblique-line unit slit (a second oblique-line unit slit) adjacent to the oblique-line unit slit face each other. That is, the upper end of the second oblique-line unit slit may be positioned above the lower end of the first oblique-line unit slit.

The plurality of oblique-line unit slits is formed so that one end of the oblique-line unit slit and the other end of another oblique-line unit slit adjacent to the oblique-line unit slit face each other, thereby efficiently removing the bubbles in the optical film.

In order to simultaneously form the plurality of unit slits slanted in the width direction of the optical film 100 on the optical film 100, a plurality of blades may be used. For example, the posture of the blade is set to correspond to an angle of the unit slit in the width direction of the optical film 100 and a plurality of unit slits may be simultaneously formed on the optical film by using a cutter device including the plurality of blades with the set posture.

FIG. 6 is a diagram illustrating an optical film with a first slit line and a second slit line according to another exemplary embodiment of the present invention.

A pair of slit lines formed in the step of forming the slit line according to an exemplary embodiment of the present invention at least including a first slit line and a second slit line may be formed to be spaced apart from each other in a length direction of the optical film 100. Each of the first slit line and the second slit line may be formed by a plurality of unit slits which is spaced apart from each other in the width direction of the optical film 100, and a first clearance between the adjacent unit slits on the first slit line and a second clearance between the adjacent unit slits on the second slit line may be arranged to cross each other in the width direction of the optical film 100.

Referring to FIG. 6, the first slit line and the second slit line including the plurality of unit slits which is spaced apart from each other in the width direction of the optical film 100 are formed on the optical film 100 to release the second film 120 from the first film 110 once and remove the bubbles in the optical film 100 which are not yet removed through the first slit line by the second slit line.

The first clearance included in the first slit line and the second clearance included in the second slit line are places where the second film is not cut, and in the first clearance and the second clearance, the bubbles in the optical film may not be discharged. The first clearance and the second clearance are arranged to cross each other in the width direction of the optical film and thus the bubbles which are not yet removed by the first clearance in the first slit line may be removed from the second slit line.

The distance at which the first slit line and the second slit line are spaced apart from each other may be set by considering a kind of connection member 130, a kind of second film 120, a thickness, and the like.

In order to simultaneously form the first slit line and the second slit line on the optical film 100, cutter devices formed in two rows or laser devices formed in two rows may be used.

According to another exemplary embodiment of the present invention, the optical film 100 manufactured by the method for manufacturing the optical film according to the exemplary embodiment of the present invention is provided.

In the optical film 100 according to another exemplary embodiment of the present invention, bubbles generated in the process of manufacturing the optical film are removed to prevent an optical property of the optical film 100 from being reduced. In the process of manufacturing the display unit, the slit line and the connection portion formed on the optical film 100 may be excluded so as not to be attached to the liquid crystal display.

Accordingly, defects of the display unit manufactured by using the optical film 100 according to another exemplary embodiment of the present invention may be reduced.

The aforementioned description of the present invention is used for exemplification, and it can be understood by those skilled in the art that the present invention can be easily modified in other detailed forms without changing the technical spirit or requisite features of the present invention. Therefore, it should be appreciated that the aforementioned exemplary embodiments are illustrative in all aspects and are not restricted. For example, respective constituent elements described as single types can be distributed and implemented, and similarly, constituent elements described to be distributed can also be implemented in a coupled form.

The scope of the present invention is represented by claims to be described below rather than the detailed description, and it is to be interpreted that the meaning and scope of the claims and all the changes or modified forms derived from the equivalents thereof come within the scope of the present invention.

What is claimed is:

1. A manufacturing method of an optical film, which manufactures an optical film in which at least a first film and a second film are stacked, the method comprising:
   a) pressing the first film and the second film comprising a connection member by passing both the first film and the second film between a pair of pressing rolls to form the optical film; or
   b) pressing the first film comprising a connection member and the second film by passing both the first film and the second film between a pair of pressing rolls to form the optical film;
   forming a slit line or a plurality of unit slits which are spaced apart from each other to form a line in a width direction of the optical film parallel to the connection member by:
      a) cutting the second film containing the connection member without cutting the first film at a rear end of a connection portion in a vicinity of the connection portion; or
      b) cutting the first film containing the connection member without cutting the second film at a rear end of a connection portion in a vicinity of the connection portion; and
   conveying the optical film containing the slit line or the line of the plurality of unit slits by passing the optical film between a pair of conveying rolls.

2. The method of claim 1, wherein the first film is a polarization film and the second film is a surface protective film.

3. The method of claim 1, further comprising forming a second slit line or a second plurality of unit slits which are spaced apart from each other to form a line in a width direction of the optical film at a front end of the connection portion parallel to the connection portion.

4. The method of claim 1, wherein the second film comprises the plurality of unit slits, which are formed to be inclined to the width direction of the optical film.

5. The method of claim 1, further comprising forming a second slit line resulting in a pair of slit lines where the first slit line and the second slit line are spaced apart from each other in the longitudinal direction of the optical film.

6. The method of claim 1, further comprising forming a second plurality of unit slits such that the first plurality of unit slits and the second plurality of units slits are spaced apart from each other in the width direction of the optical film.

7. The method of claim 6, wherein a first clearance between adjacent unit slits of the plurality of unit slits and a second clearance between the adjacent unit slits of the second plurality of unit slits are arranged to cross each other in the width direction of the optical film.

* * * * *